(12) United States Patent
Ochiai et al.

(10) Patent No.: US 12,078,813 B2
(45) Date of Patent: Sep. 3, 2024

(54) LIGHT SOURCE MODULE

(71) Applicant: HAMAMATSU PHOTONICS K.K., Hamamatsu (JP)

(72) Inventors: Takahide Ochiai, Hamamatsu (JP); Naota Akikusa, Hamamatsu (JP); Tatsuo Dougakiuchi, Hamamatsu (JP); Tadataka Edamura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/108,278

(22) Filed: Dec. 1, 2020

(65) Prior Publication Data

US 2021/0181518 A1 Jun. 17, 2021

(30) Foreign Application Priority Data

Dec. 13, 2019 (JP) .................................. 2019-225468
May 26, 2020 (JP) .................................. 2020-091242

(51) Int. Cl.
*G02B 27/09* (2006.01)
*B29C 65/16* (2006.01)
*G02B 6/10* (2006.01)
*G02B 27/48* (2006.01)

(52) U.S. Cl.
CPC .......... *G02B 27/0933* (2013.01); *G02B 6/102* (2013.01); *G02B 27/0916* (2013.01); *G02B 27/0994* (2013.01); *G02B 27/48* (2013.01); B29C 65/1619 (2013.01); B29C 65/1687 (2013.01)

(58) Field of Classification Search
CPC ...... G02B 26/103; G02B 6/102; G02B 27/48; G02B 27/0994; G02B 27/0916; G02B 27/0933; B29C 65/1687; B29C 65/1619
See application file for complete search history.

(56) References Cited

U.S. PATENT DOCUMENTS

| 3,588,217 A * | 6/1971 | Mathisen ................. G03H 1/32 359/34 |
| 9,010,965 B2 * | 4/2015 | Sudarshanam ........ G02B 27/48 362/553 |
| 9,835,845 B2 * | 12/2017 | Koshika ............ A61B 1/00147 |
| 2002/0121976 A1 * | 9/2002 | Huang ..................... G08B 3/10 340/568.1 |

(Continued)

FOREIGN PATENT DOCUMENTS

| CN | 201340489 Y | * 11/2009 | |
| CN | 101776797 A | * 7/2010 | ........... A61B 1/0008 |

(Continued)

*Primary Examiner* — Michelle R Connelly
*Assistant Examiner* — Mary A El-Shammaa
(74) *Attorney, Agent, or Firm* — Faegre Drinker Biddle & Reath LLP

(57) ABSTRACT

A light source module includes a light source; an optical fiber configured to guide light output from the light source; a pair of holding members configured to hold both ends of a first portion of the optical fiber such that the first portion extends linearly; a first vibrator configured to vibrate the first portion along a first direction intersecting an extending direction of the first portion; and a second vibrator configured to vibrate the first portion along a second direction intersecting the extending direction and differing from the first direction.

15 Claims, 8 Drawing Sheets

(56) References Cited

U.S. PATENT DOCUMENTS

| | | | |
|---|---|---|---|
| 2003/0007714 A1* | 1/2003 | Park | G02B 6/2773 385/11 |
| 2007/0012111 A1* | 1/2007 | Kim | G01H 9/004 73/632 |
| 2007/0261493 A1* | 11/2007 | Kim | G01M 5/0033 73/594 |
| 2009/0109698 A1* | 4/2009 | Koyata | G02B 19/0014 362/553 |
| 2009/0152994 A1* | 6/2009 | Numata | H03B 5/30 29/25.35 |
| 2010/0053729 A1* | 3/2010 | Tilleman | G02B 6/14 359/298 |
| 2010/0179386 A1* | 7/2010 | Kobayashi | A61B 1/0008 600/178 |
| 2013/0003343 A1* | 1/2013 | Sudarshanam | G02B 27/48 362/19 |
| 2013/0010265 A1* | 1/2013 | Curtis | G03B 21/2033 353/31 |
| 2017/0097506 A1* | 4/2017 | Schowengerdt | G06T 15/005 |
| 2017/0329117 A1* | 11/2017 | Kotani | G02B 6/14 |
| 2018/0203250 A1* | 7/2018 | Lippey | H01S 3/302 |
| 2018/0214239 A1* | 8/2018 | Dos Santos | G02B 26/0825 |
| 2018/0252863 A1* | 9/2018 | Curtis | G02B 6/02 |

FOREIGN PATENT DOCUMENTS

| | | | |
|---|---|---|---|
| CN | 103477260 A | * 12/2013 | G02B 6/2551 |
| CN | 106444245 A | * 2/2017 | |
| CN | 106501945 A | * 3/2017 | G02B 27/0933 |
| CN | 108474904 A | * 8/2018 | G02B 26/103 |
| CN | 207977351 U | * 10/2018 | |
| JP | 2003-156698 A | 5/2003 | |
| JP | 2004-295130 A | 10/2004 | |
| JP | 2007-309800 A | 11/2007 | |
| JP | 2013-525847 A | 6/2013 | |
| JP | 2014-145899 A | 8/2014 | |
| JP | 2015-143755 A | 8/2015 | |
| JP | 2016-526709 A | 9/2016 | |
| JP | 2018-530927 A | 10/2018 | |
| JP | 2022507927 A | * 1/2022 | |
| WO | WO 2011/133804 A2 | 10/2011 | |
| WO | WO-2014031598 A3 | * 4/2014 | G02B 27/48 |
| WO | WO 2015/008211 A1 | 1/2015 | |
| WO | WO 2017/029363 A1 | 2/2017 | |

\* cited by examiner

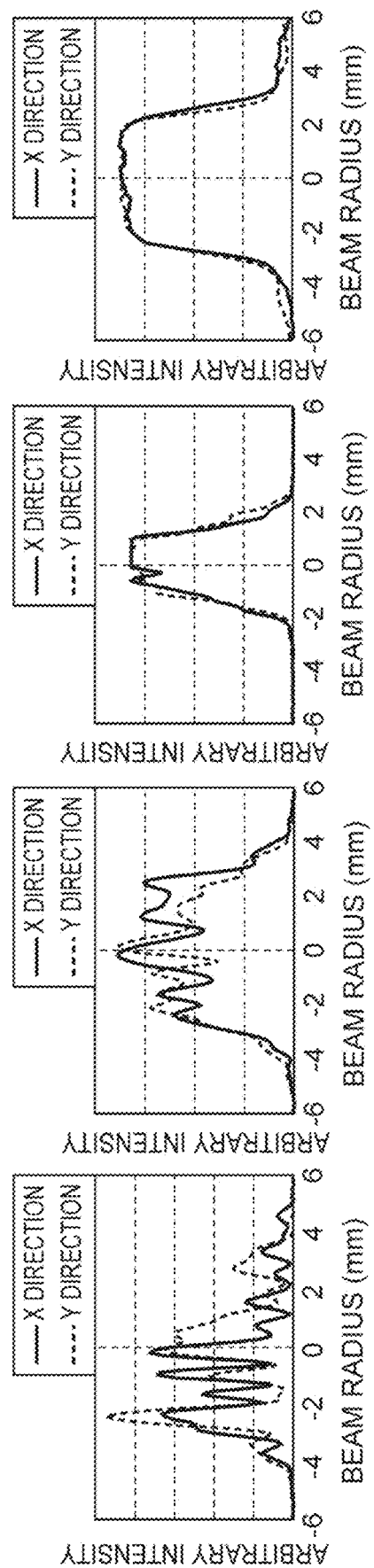

LIGHT SOURCE MODULE

TECHNICAL FIELD

One aspect of the present disclosure relates to a light source module.

BACKGROUND

There is known a light source module including a light source, an optical fiber that guides light output from the light source, and vibration means that vibrates the optical fiber (for example, refer to Japanese Unexamined Patent Publication No. 2003-156698). In the light source module, the vibration means vibrates the optical fiber so that speckle noise in output light is reduced.

SUMMARY

Technical Problem

An object of one aspect of the present disclosure is to provide a light source module that can improve spatial homogeneity of output light.

Solution to Problem

According to one aspect of the present disclosure, there is provided a light source module including: a light source; an optical fiber that guides light output from the light source; a pair of holding members that holds both ends of a first portion of the optical fiber such that the first portion extends linearly; a first vibrator that vibrates the first portion along a first direction intersecting an extending direction of the first portion; and a second vibrator that vibrates the first portion along a second direction intersecting the extending direction and differing from the first direction.

In the light source module, both ends of the first portion are held by the pair of holding members, so that the first portion of the optical fiber extends linearly. The first vibrator vibrates the first portion along the first direction intersecting the extending direction of the first portion, and the second vibrator vibrates the first portion along the second direction that intersects the extending direction of the first portion and differs from the first direction. As in the light source module disclosed in Japanese Unexamined Patent Publication No. 2003-156698, when the optical fiber vibrates only along one direction, vibration (standing wave) dependent on the natural frequency of the optical fiber occurs. In contrast, in the light source module, since the first portion having a linear shape vibrates along the first direction and the second direction which differ from each other, such a standing wave can be suppressed from occurring, and spatial homogeneity of the output light can be improved.

A second portion of the optical fiber may be bent such that stress is applied to the second portion. In this case, the light can be irregularly reflected in the second portion, and the spatial homogeneity of the output light can be further improved.

A second portion of the optical fiber may be wound at least once. In this case, the light can be irregularly reflected in the second portion, and the spatial homogeneity of the output light can be much further improved.

The second portion may be located downstream of the first portion in a guiding direction of the light by the optical fiber. In this case, the spatial homogeneity of the output light can be much further improved.

The light source module may further include a holder that holds an output end of the optical fiber. The optical fiber may include a third portion located downstream of the second portion in the guiding direction. The holder may include a cylindrical member having flexibility. The third portion may be disposed inside the cylindrical member. In this case, the cylindrical member inside which the third portion is disposed can be moved (bent), so that the output end of the optical fiber is pointed toward a desired direction. In addition, when the cylindrical member is moved, since the second portion which is bent serves as play, unnecessary stress can be suppressed from being applied to the optical fiber.

At least one of the first vibrator and the second vibrator may include a plate-shaped member, and a vibration body fixed to the plate-shaped member to vibrate the plate-shaped member. The first portion of the optical fiber may be fixed to the plate-shaped member. In this case, the plate-shaped member and the vibration body can be used to vibrate the first portion of the optical fiber.

The first vibrator may include a first plate-shaped member extending perpendicular to the first direction, and a first vibration body fixed to the first plate-shaped member to vibrate the first plate-shaped member. The second vibrator may include a second plate-shaped member extending perpendicular to the second direction, and a second vibration body fixed to the second plate-shaped member to vibrate the second plate-shaped member. The first portion of the optical fiber may be fixed to each of the first plate-shaped member and the second plate-shaped member. In this case, the first portion of the optical fiber can vibrate independently along the first direction and the second direction.

The light source may be a quantum cascade laser. In this case, spatially homogeneous light in a mid-infrared range can be output as output light from the light source module.

The light source module may further include a compressor that applies compression force to a compression portion that is a part of the optical fiber. The compression portion may be compressed in at least one direction intersecting an extending direction of the compression portion by the compression force. In this case, spatially homogeneous ring-shaped light can be output.

The compression portion may be a part other than the first portion in the optical fiber. In this case, the compression force can be avoided from disturbing the vibration of the first portion, and the spatial homogeneity of the output light can be secured.

The compressor may be formed of one of the pair of holding members. In this case, the configuration can be simplified.

The compressor may be configured to change a magnitude of the compression force. In this case, the compression force can be changed to adjust the shape, the intensity, or the like of the output light.

The light source module may further include a housing that accommodates the light source, the optical fiber, the pair of holding members, the first vibrator, and the second vibrator. The compression portion may be a part of the optical fiber, the part being located outside the housing. In this case, the compression force can be easily applied to the compression portion.

The compression portion may be compressed along a single direction intersecting the extending direction of the compression portion or may be compressed over an entire periphery. In either case, spatially homogeneous ring-shaped light can be output.

Advantageous Effects of Invention

One aspect of the present disclosure can provide the light source module that can improve spatial homogeneity of output light.

BRIEF DESCRIPTION OF THE DRAWINGS

FIGS. 5A to 5D are graphs showing the shapes of output light at the output end of the optical fiber.

DETAILED DESCRIPTION

Hereinafter, one embodiment of the present disclosure will be described in detail with reference to the drawings. Incidentally, in the following description, the same reference signs are used for the same or equivalent components and duplicated descriptions will be omitted.

Figure 1:
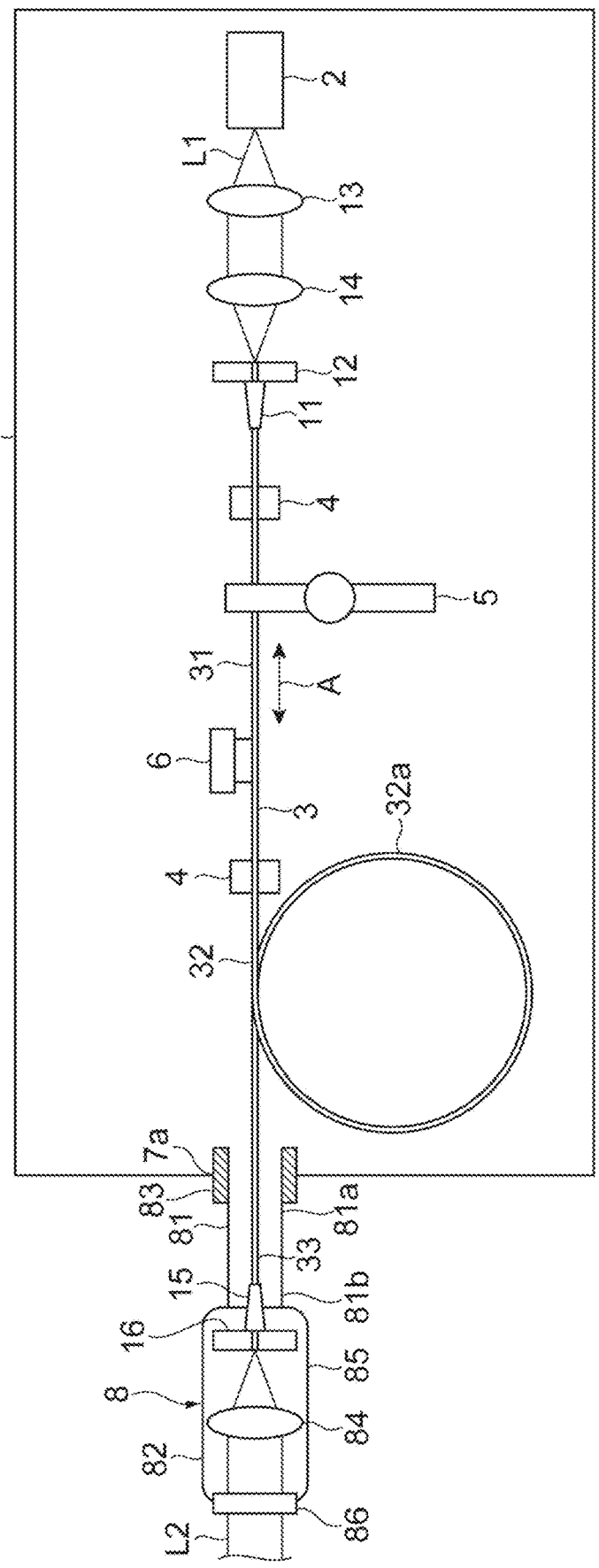
FIG. 1 is a view illustrating a light source module according to an embodiment.

As illustrated in FIG. 1, a light source module 1 includes a light source 2, an optical fiber 3, a pair of holding members 4, a first vibrator 5, a second vibrator 6, a housing 7, and a holder 8. The housing 7 is formed in, for example, a box shape, and accommodates the light source 2, the optical fiber 3, the pair of holding members 4, the first vibrator 5, and the second vibrator 6. In the light source module 1, light L1 output from the light source 2 is guided to be output from an end portion of the optical fiber 3 to the outside as output light L2 by the optical fiber 3. The light source module 1 is used to process a resin material, for example.

The light source 2 is, for example, a quantum cascade laser. In this case, the light L1 output from the light source 2 is a laser beam in a mid-infrared range having a wavelength of approximately 4 µm to 15 µm. The light source 2 may be a Sb-based or Pb-based semiconductor laser diode, an interband cascade laser, a solid-state laser of which the wavelength is variable by optical parametric oscillator, or the like.

The optical fiber 3 is a multimode fiber. The optical fiber 3 is, for example, a plastic hollow fiber, and the inner surface of the optical fiber 3 is coated with a metal such as silver. In this case, the reflectance on the inner surface of the fiber can be brought close to 100%, and the transmission efficiency can be improved.

A connector 11 is provided at an input end of the optical fiber 3, and the optical fiber 3 is fixed to an adapter 12 via the connector 11. The light L1 output from the light source 2 is input to the adapter 12 via a collimating lens 13 and a condensing lens 14 to be incident into the optical fiber 3.

A connector 15 is provided at an output end of the optical fiber 3, and the optical fiber 3 is fixed to an adapter 16 via the connector 15. The output light L2 is output from the optical fiber 3 to the outside of the light source module 1 via the adapter 16. The output end of the optical fiber 3 is held by the holder 8. The holder 8 will be described later in detail.

The optical fiber 3 includes a first portion 31, a second portion 32, and a third portion 33. The first portion 31 is one portion in a longitudinal direction of the optical fiber 3, the second portion 32 is another portion in the longitudinal direction, and the third portion 33 is further another portion in the longitudinal direction. The second portion 32 is located downstream of the first portion 31 (on a side opposite to the light source 2) in a guiding direction of the light L1 by the optical fiber 3. The third portion 33 is located downstream of the second portion 32 in the guiding direction.

Both ends of the first portion 31 are held by the pair of holding members 4. Therefore, the first portion 31 extends linearly along an extending direction A. In other words, the pair of holding members 4 hold both ends of the first portion 31 such that the first portion 31 extends linearly. Each of the holding members 4 is, for example, a jig that can fix the optical fiber 3 by clamping. The jigs are fixed to, for example, a fixing surface such as a bottom surface of the housing 7.

The first vibrator 5 is disposed between the pair of holding members 4 to vibrate (displace) the first portion 31 along a first direction D1 intersecting the extending direction A. In this example, the first direction D1 is perpendicular to the extending direction A, and is a vertical direction.

The second vibrator 6 is disposed between the pair of holding members 4 to vibrate (displace) the first portion 31 along a second direction D2 that intersects the extending direction A and differs from the first direction D1. In this example, the second direction D2 is perpendicular to the extending direction A and the first direction D1, and is a horizontal direction. The second vibrator 6 is located downstream of the first vibrator 5 in the guiding direction of the light L1 by the optical fiber 3.

Figure 2:
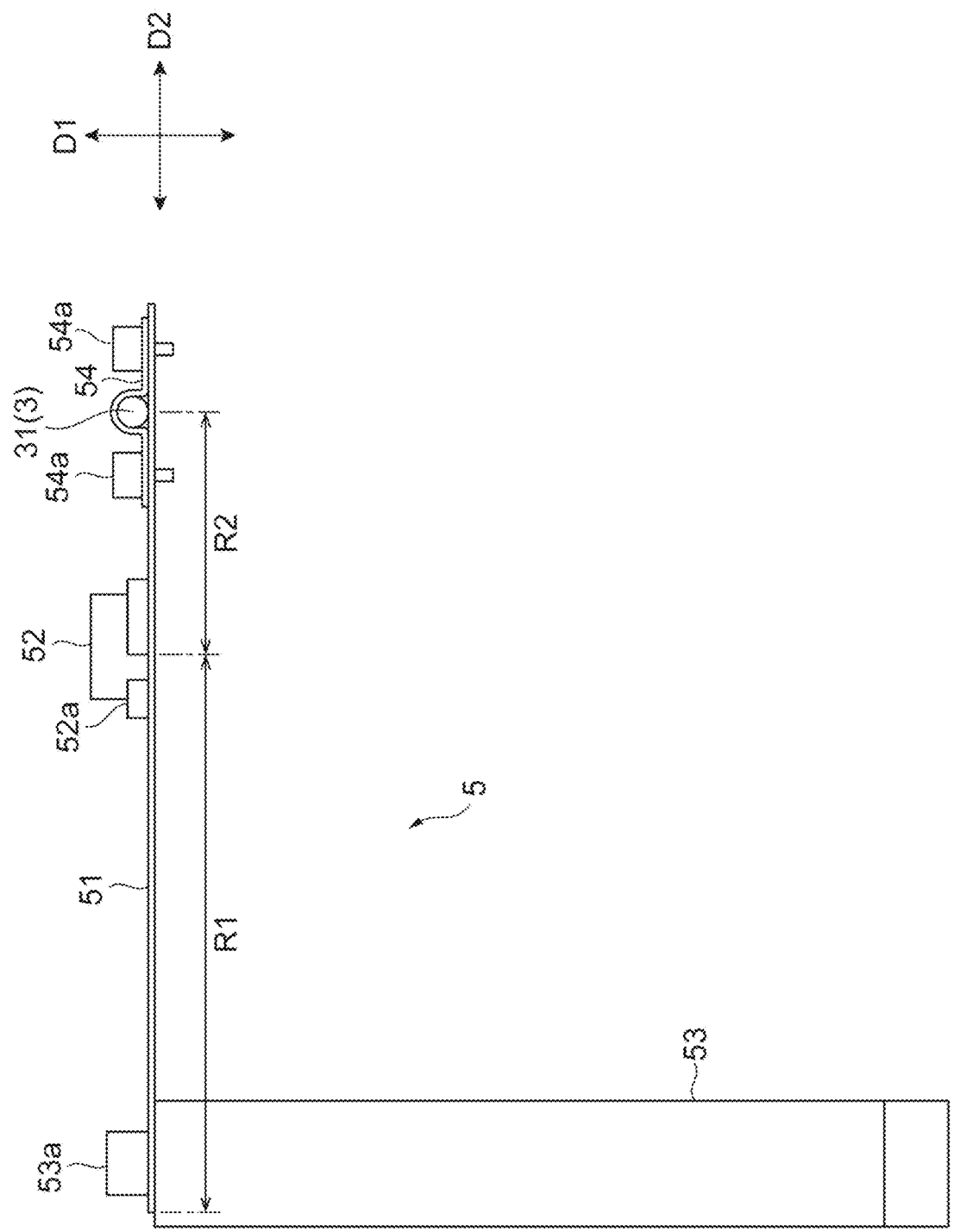
FIG. 2 is a view illustrating a first vibrator.

As illustrated in FIG. 2, the first vibrator 5 includes a plate-shaped member (first plate-shaped member) 51, an vibration body (first vibration body) 52, and a column (support portion) 53. The plate-shaped member 51 is formed in a plate shape by metal, for example. The plate-shaped member 51 extends along the second direction D2 (direction perpendicular to the extending direction A and the first direction D1). The thickness of the plate-shaped member 51 is, for example, approximately 0.2 mm. The metal material forming the plate-shaped member 51 is, for example, phosphor bronze. In this case, the durability of the plate-shaped member 51 can be improved.

The first portion 31 of the optical fiber 3 is fixed to a distal portion of the plate-shaped member 51 with a restraint member 54. Specifically, for example, in a state where the first portion 31 is interposed between the restraint member 54 and the plate-shaped member 51, the restraint member 54 is fastened to the plate-shaped member 51 with fastening members 54a such as screws, so that the first portion 31 is fixed to the plate-shaped member 51. A proximal portion of the plate-shaped member 51 is fixed to, for example, a distal portion of the column 53 with fastening members 53a such as screws. A proximal portion of the column 53 is fixed to, for example, a fixing surface such as the bottom surface of the housing 7.

The vibration body 52 is, for example, a coin-shaped (columnar) eccentric motor. In the eccentric motor, a weight having an asymmetric shape is fixed to a rotary shaft, and vibration is generated as the rotary shaft rotates. The vibration body 52 is fixed to the plate-shaped member 51 with a fixing member 52a. The vibration of the vibration body 52 is transmitted to the first portion 31 of the optical fiber 3 via the plate-shaped member 51, so that the first portion 31 vibrates along the first direction D1.

As an example, the ratio of a distance R1 from the center of the vibration body 52 to a proximal end of the plate-shaped member 51 to a distance R2 from the center of the vibration body 52 to the center of the optical fiber 3, namely, R1:R2 is 5:2. In this case, since the vibration body 52 is disposed close to the optical fiber 3 in the plate-shaped member 51 (closer to the optical fiber 3 than to the center of the plate-shaped member 51), the vibration of the vibration body 52 can be efficiently transmitted to the optical fiber 3. In addition, since the distance between the vibration body 52 and the optical fiber 3 can be secured, the restraint member 54 can be suppressed from being damaged.

The vibration frequency of vibration of the first portion 31 induced by the first vibrator 5 is, for example, approximately 100 Hz to 1 kHz. When the vibration frequency is 100 Hz or more, the effect of improving spatial homogeneity of the output light L2 which will be described later is effective. When the vibration frequency is 1 kHz or less, the restraint member 54 can be suppressed from being damaged.

Figure 3:
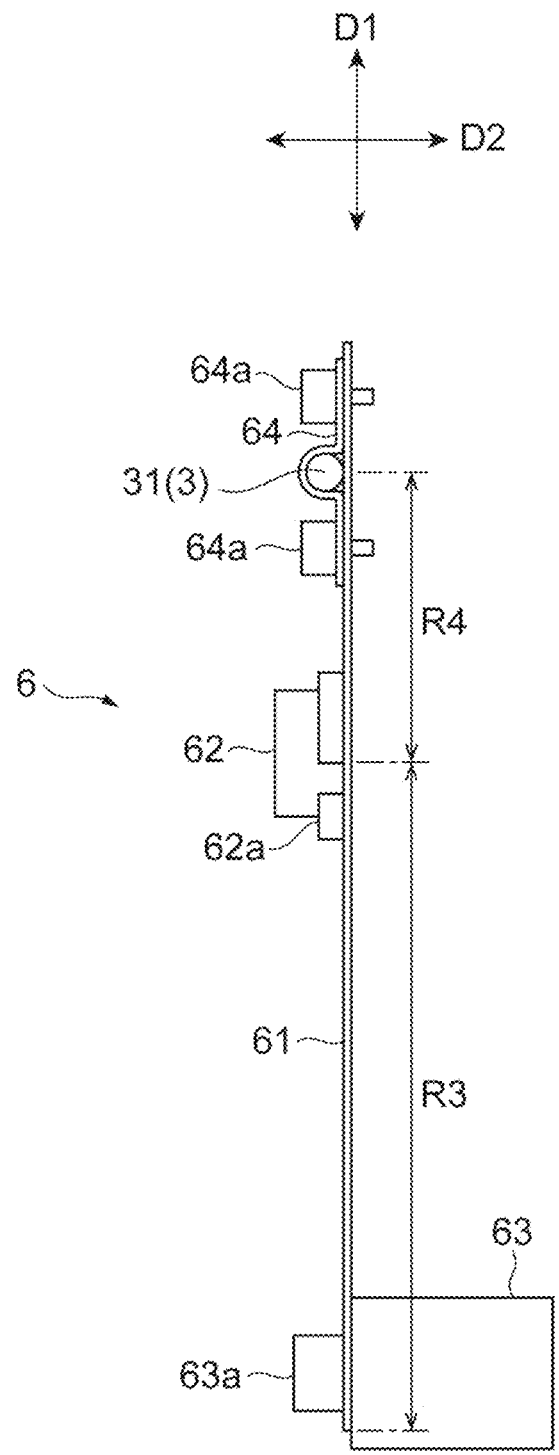
FIG. 3 is a view illustrating a second vibrator.

As illustrated in FIG. 3, the second vibrator 6 includes a plate-shaped member (second plate-shaped member) 61, an vibration body (second vibration body) 62, and a support portion 63. The plate-shaped member 61 is formed in, for example, a metal plate shape. The plate-shaped member 61 extends along the first direction D1 (direction perpendicular to the extending direction A and the second direction D2). The thickness of the plate-shaped member 61 is, for example, approximately 0.2 mm. The metal material forming the plate-shaped member 61 is, for example, phosphor bronze. In this case, the durability of the plate-shaped member 61 can be improved.

The first portion 31 of the optical fiber 3 is fixed to a distal portion of the plate-shaped member 61 with a restraint member 64. Specifically, for example, in a state where the first portion 31 is interposed between the restraint member 64 and the plate-shaped member 61, the restraint member 64 is fastened to the plate-shaped member 61 with fastening members 64a such as screws, so that the first portion 31 is fixed to the plate-shaped member 61. A proximal portion of the plate-shaped member 61 is fixed to, for example, the support portion 63 with fastening members 63a such as screws. The support portion 63 is fixed to, for example, a fixing surface such as the bottom surface of the housing 7.

The vibration body 62 is, for example, a coin-shaped (columnar) eccentric motor. In the eccentric motor, a weight having an asymmetric shape is fixed to a rotary shaft, and vibration is generated as the rotary shaft rotates. The vibration body 62 is fixed to the plate-shaped member 61 with a fixing member 62a. The vibration of the vibration body 62 is transmitted to the first portion 31 of the optical fiber 3 via the plate-shaped member 61, so that the first portion 31 vibrates along the second direction D2.

As an example, the ratio of a distance R3 from the center of the vibration body 62 to a proximal end of the plate-shaped member 61 to a distance R4 from the center of the vibration body 62 to the center of the optical fiber 3, namely, R3:R4 is 5:2. In this case, since the vibration body 62 is disposed close to the optical fiber 3 in the plate-shaped member 61 (closer to the optical fiber 3 than to the center of the plate-shaped member 61), the vibration of the vibration body 62 can be efficiently transmitted to the optical fiber 3. In addition, since the distance between the vibration body 62 and the optical fiber 3 can be secured, the restraint member 64 can be suppressed from being damaged.

The vibration of the first portion 31 induced by the second vibrator 6 is not synchronized (unsynchronized) with the vibration of the first portion 31 induced by the first vibrator 5. Therefore, vibration is randomly (irregularly) applied to the first portion 31 along the first direction D1 and the second direction D2 which differ from each other. The vibration frequency of vibration of the first portion 31 induced by the second vibrator 6 is, for example, approximately 100 Hz to 1 kHz. When the vibration frequency is 100 Hz or more, the effect of improving spatial homogeneity of the output light L2 which will be described later is effective. When the vibration frequency is 1 kHz or less, the restraint member 64 can be suppressed from being damaged.

As illustrated in FIG. 1, the second portion 32 of the optical fiber 3 includes a winding portion 32a that is formed by winding the optical fiber 3 once. The winding portion 32a has, for example, a circular shape when viewed in the first direction D1. The second portion 32 is bent so as to form the winding portion 32a, so that bending stress is applied to the winding portion 32a. In other words, the second portion 32 is bent such that stress is applied to the winding portion 32a.

Stress is applied to the winding portion 32a to the extent that the transmission efficiency of the optical fiber 3 is not impaired. The diameter of the winding portion 32a is, for example, approximately 2 to 4 times the minimum bending radius of the optical fiber 3. As one example, when the diameter of the core of a hollow fiber forming the optical fiber 3 is 1,500 μm and the minimum bending radius is 5 cm, the diameter of the winding portion 32a may be 15 cm. Therefore, a mode concentrated in the core can be suppressed from leaking to a cladding mode to cause loss.

As illustrated in FIG. 1, the holder 8 includes a cylindrical member 81 and an irradiation unit 82. The irradiation unit 82 includes a collimating lens 84 and a housing 85 that accommodates the collimating lens 84. The cylindrical member 81 has flexibility and is formed in a cylindrical shape. The cylindrical member 81 is fixed to the housing 7. More specifically, an insertion hole 7a is formed in the housing 7, and a fixing member 83 having an annular shape is fixed to the insertion hole 7a. A proximal portion 81a of the cylindrical member 81 is connected to the housing 7 via the fixing member 83. A distal portion 81b of the cylindrical member 81 is connected to the housing 85 of the irradiation unit 82. The optical fiber 3 is inserted into the insertion hole 7a, and the third portion 33 of the optical fiber 3 is disposed inside the cylindrical member 81.

The housing 85 of the irradiation unit 82 accommodates the collimating lens 84 and the connector 15 and the adapter 16 which are provided at the output end of the optical fiber 3. In addition, the housing 85 is provided with an emission window 86 from which the output light L2 is to be emitted. The output light L2 emitted from the optical fiber 3 is guided to be output from the emission window 86 to the outside by the collimating lens 84. In the holder 8, the irradiation unit 82 is movable due to the flexibility of the cylindrical member 81, and the cylindrical member 81 inside which the third portion 33 is disposed is moved (bent), so that the output end of the optical fiber 3 can be pointed toward a desired direction. Namely, the flexible irradiation of the output light L2 is feasible.

[Functions and Effects]

FIGS. 4A to 4D and FIGS. 5A to 5D show the shapes of the output light L2 at the output end of the optical fiber 3, which are acquired in different test conditions. In a first example shown in FIGS. 4A and 5A, the first vibrator 5 and the second vibrator 6 did not vibrate the optical fiber 3. In a second example shown in FIGS. 4B and 5B, only one of the first vibrator 5 and the second vibrator 6 vibrated the optical fiber 3. In a third example illustrated in FIGS. 4C and 5C and a fourth example shown in FIGS. 4D and 5D, both of the first vibrator 5 and the second vibrator 6 vibrated the optical fiber 3. In the first to third examples, the winding portion 32*a* was not formed in the second portion 32 of the optical fiber 3. In the fourth example, the winding portion 32*a* was formed in the second portion 32 of the optical fiber 3.

From the comparison of results of the first to third examples, it is found that when the first vibrator 5 and the second vibrator 6 vibrate the optical fiber 3, spatial homogeneity of the output light L2 is improved. Namely, it is found that in FIGS. 4A and 5A, the output light L2 is spatially inhomogeniously distributed, whereas in FIGS. 4C and 5C, the output light L2 is concentrated in a hollow core mode to have a shape close to a unimodal Gaussian beam shape. In addition, it is found that in FIGS. 4C and 5C, the spatial homogeneity of the output light L2 is improved than in FIGS. 4B and 5B. It is considered that the reason is that in the second example, since the optical fiber 3 vibrates only along one direction, vibration (standing wave) dependent on the natural frequency of the optical fiber 3 occurs.

Figure 4A:
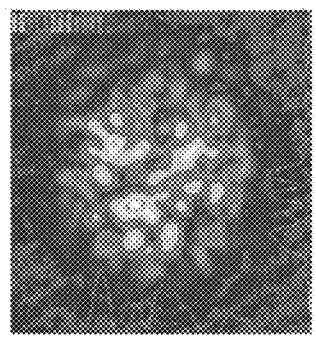
FIGS. 4A to 4D are pictures showing the shapes of output light at an output end of an optical fiber.
Figure 4B:
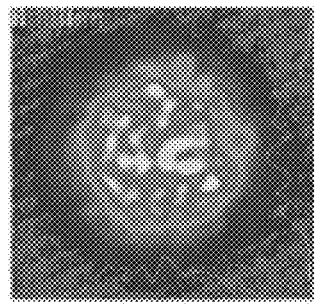
Figure 4C:
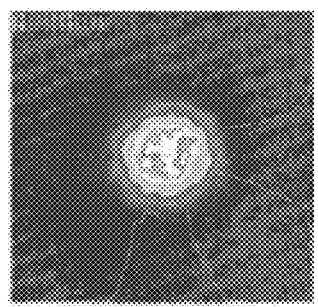
Figure 4D:
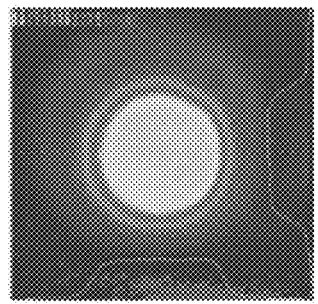

In addition, it is found that in FIGS. 4D and 5D, the spatial homogeneity of the output light L2 is further improved than in FIGS. 4C and 5C. As shown in FIGS. 4D and 5D, in the fourth example, the output light L2 had a top hat shape. The top hat shape of the output light L2 is useful for application to perforating, welding, or the like in resin processing.

As described above, in the light source module 1, both ends of the first portion 31 are held by the pair of holding members 4, so that the first portion 31 of the optical fiber 3 extends linearly. The first vibrator 5 vibrates the first portion 31 along the first direction D1 intersecting the extending direction A of the first portion 31, and the second vibrator 6 vibrates the first portion 31 along the second direction D2 that intersects the extending direction A of the first portion 31 and differs from the first direction D1. When the optical fiber 3 vibrates only along one direction, vibration (standing wave) dependent on the natural frequency of the optical fiber 3 occurs, which is a concern. In contrast, in the light source module 1, since the first portion 31 having a linear shape vibrates along the first direction D1 and the second direction D2 which differ from each other, such a standing wave can be suppressed from occurring, and the spatial homogeneity of the output light L2 can be improved.

The case where "the first portion 31 extends linearly" is meant to include a case where the first portion 31 extends linearly with an allowable degree of deflection. For example, when the diameter (inner diameter) of the optical fiber 3 is 1,500 μm, the allowable amount of deflection is approximately 1 mm Namely, the allowable amount of deflection is smaller than the diameter of the optical fiber 3. Alternatively, the allowable amount of deflection is 1% or less of the distance between the pair of holding members 4 along the extending direction A of the optical fiber 3. Namely, when the distance between the pair of holding members 4 is 10 cm, the allowable amount of deflection is 1 mm or less.

The second portion 32 of the optical fiber 3 is bent such that stress is applied to the second portion 32. Therefore, light can be irregularly reflected in the second portion 32, and the spatial homogeneity of the output light L2 can be further improved. As a result, as described above, the output light L2 can be formed in a top hat shape. Since the output light L2 has a top hat shape, when the light source module 1 is applied to resin processing, efficient and precise processing can be realized. In addition, in the light source module 1, the output light L2 can be formed in a top hat shape without using a complicated optical system where a lens, a space light modulator, and the like are assembled, and thus the configuration of the light source module 1 can be simplified.

The second portion 32 of the optical fiber 3 is wound once. Therefore, light can be irregularly reflected in the second portion 32, and the spatial homogeneity of the output light L2 can be much further improved.

The second portion 32 is located downstream of the first portion 31 in the guiding direction of light by the optical fiber 3. Therefore, the spatial homogeneity of the output light L2 can be much further improved. Namely, by applying stress to the second portion 32 after the first vibrator 5 and the second vibrator 6 apply vibration to the first portion 31 to form light in a unimodal beam shape, the output light L2 can be formed in a top hat shape.

The holder 8 includes the cylindrical member 81 having flexibility, and the third portion 33 of the optical fiber 3 is disposed inside the cylindrical member 81. Therefore, the cylindrical member 81 inside which the third portion 33 is disposed can be moved (bent), so that the output end of the optical fiber 3 is pointed toward a desired direction. In addition, when the cylindrical member 81 is moved, since the second portion 32 which is bent serves as play, unnecessary stress can be suppressed from being applied to the optical fiber 3.

The first vibrator 5 and the second vibrator 6 include the plate-shaped members 51 and 61, and the vibration bodies 52 and 62 that are fixed to the plate-shaped members 51 and 61 to vibrate the plate-shaped members 51 and 61, and the first portion 31 of the optical fiber 3 is fixed to the plate-shaped members 51 and 61. Therefore, the plate-shaped members 51 and 61 and the vibration bodies 52 and 62 can be used to vibrate the first portion 31 of the optical fiber 3. In addition, the first portion 31 of the optical fiber 3 can vibrate independently along the first direction D1 and the second direction D2. Namely, the vibration induced by the first vibrator 5 and the vibration induced by the second vibrator 6 can be suppressed from being mixed together, and the vibration induced by the first vibrator 5 and the vibration induced by the second vibrator 6 can be reliably independent from each other.

The light source 2 is a quantum cascade laser. Therefore, spatially homogeneous light in a mid-infrared range can be output as the output light L2 from the light source module 1.

The present disclosure is not limited to the above embodiment. For example, the material and the shape of each configuration are not limited to the material and the shape described above, and various materials and shapes can be adopted. The second portion 32 may be bent to form an angle or bent in a zigzag shape to apply stress to the second portion 32 of the optical fiber 3. The second portion 32 may be located upstream of the first portion 31 in the guiding direction of light by the optical fiber 3. The second portion 32 may be wound two or more times. A plane on which the winding portion 32*a* is disposed is not limited, and for example, the winding portion 32*a* may have a circular shape when viewed in the second direction D2. The optical fiber 3 may be bundled in a portion of the winding portion 32*a*, in which the optical fiber 3 overlaps itself, by a holding member. In this case, the holding member 4 of the pair of holding members 4, which is located on a second portion 32 side, may be omitted.

In addition to the first vibrator 5 and the second vibrator 6, a third vibrator may be provided. The third vibrator may vibrate the first portion 31 of the optical fiber 3, for example, along a third direction that intersects the extending direction and differs from the first direction D1 and the second direction D2. The first direction D1 may be a direction intersecting the extending direction A, and may not be necessarily perpendicular to the extending direction A. However, if the first direction D1 is perpendicular to the extending direction A, the optical fiber 3 can be suppressed from extending or contracting when the first portion 31 vibrates along the first direction D1. This also applies to the second direction D2. The case where "the first portion 31 vibrates along the first direction D1 perpendicular to the extending direction A" also includes a case where a direction where vibration is applied to the first portion 31 is slightly deviated from the first direction D1, for example, due to an error or the like in position where each member is disposed. This also applies to the second direction D2.

Figure 6:
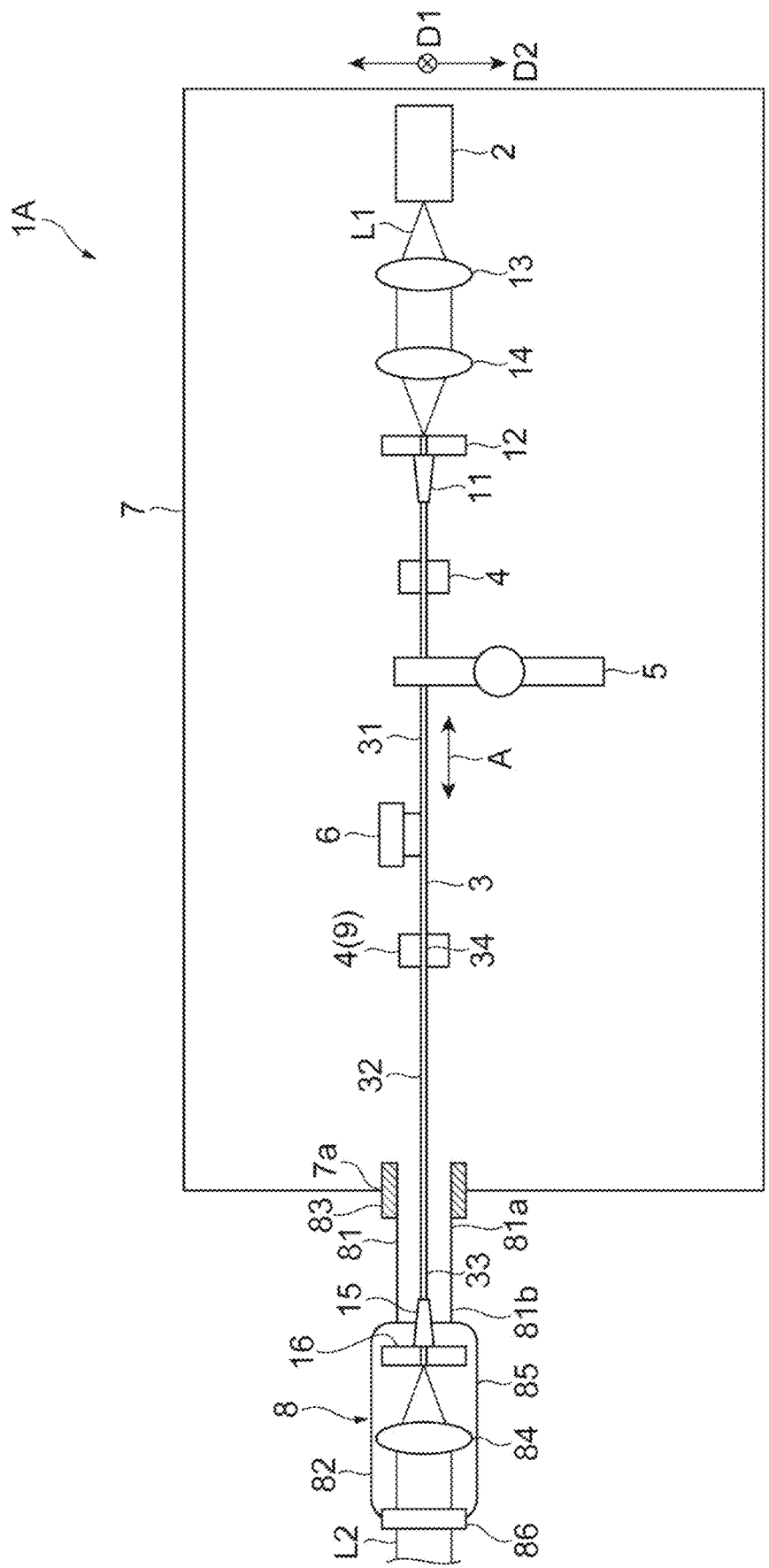
FIG. 6 is a view illustrating a light source module according to a modification example.

A light source module 1A according to a modification example will be described with reference to FIG. 6. In the light source module 1A, one of the pair of holding members 4 is formed as a compressor 9. More specifically, the compressor 9 is formed of the holding member 4 of the pair of holding members 4, which is located downstream in the guiding direction.

Figure 7:
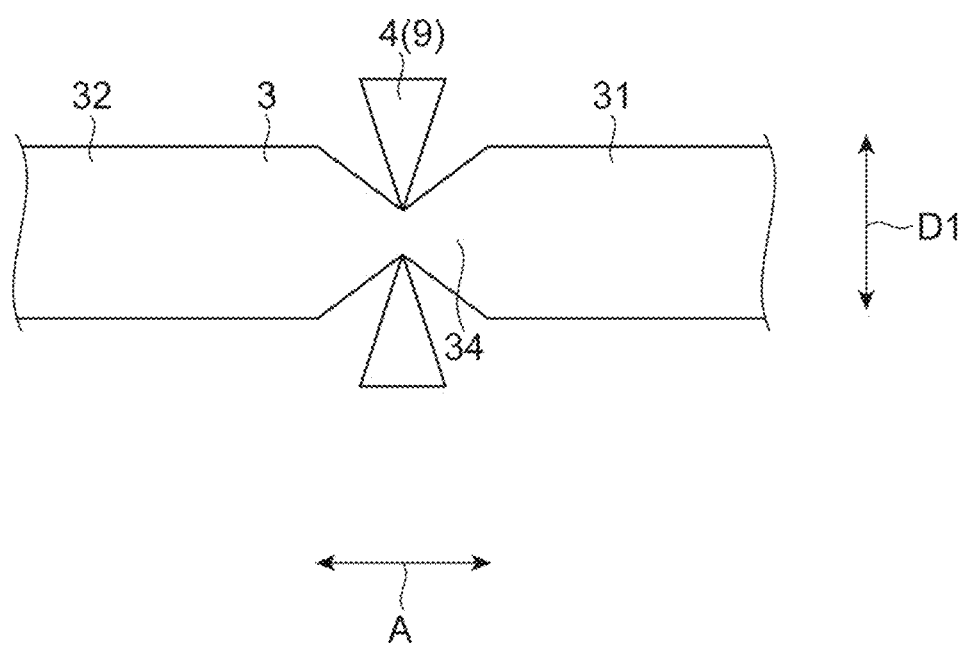
FIG. 7 is a view illustrating a mode where an optical fiber is compressed by a compressor.

The compressor 9 is, for example, a fixing jig, and applies compression force to a compression portion 34 of the optical fiber 3. As illustrated in FIG. 7, the compression portion 34 is compressed along the first direction D1 by the compression force. In this example, the compression portion 34 is compressed only along a single direction (first direction D1) intersecting the extending direction A of the compression portion 34. The compression portion 34 is a part of the optical fiber 3, and is a boundary portion between the first portion 31 and the second portion 32 of the optical fiber 3. The compression portion 34 can be regarded as a part of the second portion 32 (namely, a part other than the first portion 31). In the light source module 1A, the winding portion 32a is not provided in the second portion 32 of the optical fiber 3, and the second portion 32 extends linearly.

Similar to the above embodiment, the light source module 1A according to a modification example can also improve the spatial homogeneity of the output light L2. In addition, the compression portion 34 of the optical fiber 3 is compressed by the compressor 9, so that spatially homogeneous ring-shaped light can be output. This point will be further described with reference to FIGS. 8A to 8C.

Figure 8A:
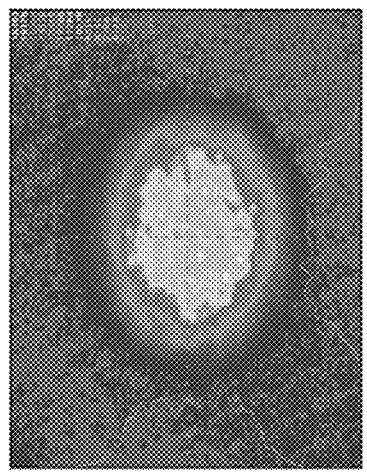
FIGS. 8A to 8C are pictures showing the shapes of output light at an output end of the optical fiber.
Figure 8B:
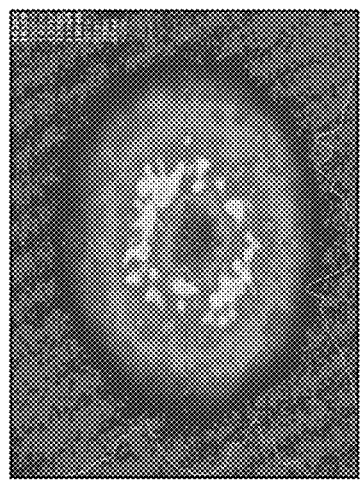
Figure 8C:
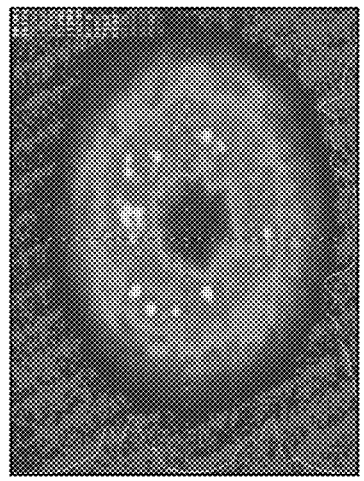

In the examples shown in FIGS. 8A to 8C, both of the first vibrator 5 and the second vibrator 6 vibrated the first portion 31 of the optical fiber 3, and the compression portion 34 of the optical fiber 3 was compressed by the compressor 9. The winding portion 32a was not formed in the second portion 32 of the optical fiber 3. The magnitude of the compression force that the compressor 9 applied to the compression portion 34 of the optical fiber 3 was increased in order of FIGS. 8A, 8B, and 8C. Namely, the compression force in FIG. 8C is larger than the compression force in FIG. 8B, and the compression force in FIG. 8B is larger than the compression force in FIG. 8A.

From FIGS. 8A to 8C, it is found that the optical fiber 3 is compressed by the compressor 9 and thus spatially homogeneous ring-shaped light can be output. In addition, from comparison between FIGS. 8B and 8C, it is found that the larger the compression force is, the larger an opening formed at the center of the output light is. Such ring-shaped light can not only be applied to processing but also be used in, for example, a local excitation light source in a stimulated emission depletion (STED) microscope or the like. When the magnitude of the compression force is determined, for example, the compression force is changed while the shape and the intensity of the output light are monitored, and thus the magnitude of a proper compression force can be determined such that spatially homogeneous ring-shaped light is output.

In addition, in the light source module 1A, the compression portion 34 is a part other than the first portion 31 in the optical fiber 3. Therefore, the compression force of the compressor 9 can be avoided from disturbing the vibration of the first portion 31, and the spatial homogeneity of the output light can be secured.

As another modification example, in the light source module 1A, the compressor 9 may be configured to be able to change the magnitude of the compression force. For example, the compressor 9 may be configured to include a screw mechanism and to be able to change the magnitude of the compression force according to the amount of fastening of a screw. When the magnitude of the compression force is changeable, the compression force can be changed to adjust the shape, the intensity, or the like of the output light.

As another modification example, in the light source module 1A, the compression portion 34 may be a part of the optical fiber 3, which is located outside the housing 7. In the example of FIG. 6, a part of the third portion 33 of the optical fiber 3 is located outside the housing 7. The compressor 9 may be provided to apply compression force to the part of the third portion 33. Namely, the compression portion 34 may be a part of the third portion 33. When the compression portion 34 is a part of the optical fiber 3, which is located outside the housing 7, compression force can be easily applied to the compression portion 34. Particularly, when the compressor 9 is configured to be able to change the magnitude of the compression force, the configuration where the compression portion 34 is a part of the optical fiber 3, which is located outside the housing 7, is advantageous in that the adjustment of the compression force of the compressor 9 can be facilitated.

As another modification example, in the light source module 1A, the compression portion 34 may be compressed over the entire periphery. For example, the compressor 9 may be formed of a jig that compresses the compression portion 34 in all circumferential direction. Even in this case, spatially homogeneous ring-shaped light can be output.

As another modification example, in the light source module 1A, the winding portion 32a may be provided in the second portion 32 of the optical fiber 3. The optical fiber 3 may be bundled in a portion of the winding portion 32a, in which the optical fiber 3 overlaps itself, by a holding member, and the holding member may be formed as a compressor. In this case, the holding member 4 (compressor 9) of the pair of holding members 4, which is located on the second portion 32 side, may be omitted. In other words, the compressor 9 may be provided separately from the pair of holding members 4 to compress the second portion 32 of the optical fiber 3. In the light source module 1A, the compressor 9 may be formed of the holding member 4 of the pair of holding members 4, which is located upstream in the guiding direction.

What is claimed is:

1. A light source module comprising:
   a light source;
   an optical fiber configured to guide light output from the light source;
   a pair of holding members configured to hold both ends of a first portion of the optical fiber such that the first portion extends linearly;

a first vibrator disposed between the pair of holding members and configured to vibrate the first portion along a first direction intersecting an extending direction of the first portion; and a second vibrator disposed between the pair of holding members and configured to vibrate the first portion along a second direction intersecting the extending direction and differing from the first direction.

2. The light source module according to claim 1, wherein a second portion of the optical fiber is bent such that stress is applied to the second portion.

3. The light source module according to claim 1, wherein a second portion of the optical fiber is wound at least once.

4. The light source module according to claim 2, wherein the second portion is located downstream of the first portion in a guiding direction of the light by the optical fiber.

5. The light source module according to claim 4, further comprising:

a holder configured to hold an output end of the optical fiber, wherein the optical fiber includes a third portion located downstream of the second portion in the guiding direction, the holder includes a cylindrical member having flexibility, and the third portion is disposed inside the cylindrical member.

6. The light source module according to claim 1, wherein at least one of the first vibrator and the second vibrator includes a plate-shaped member, and a vibration body fixed to the plate-shaped member to vibrate the plate-shaped member, and the first portion of the optical fiber is fixed to the plate-shaped member.

7. The light source module according to claim 1, wherein the first vibrator includes a first plate-shaped member extending perpendicular to the first direction, and a first vibration body fixed to the first plate-shaped member to vibrate the first plate-shaped member, the second vibrator includes a second plate-shaped member extending perpendicular to the second direction, and a second vibration body fixed to the second plate-shaped member to vibrate the second plate-shaped member, and the first portion of the optical fiber is fixed to each of the first plate-shaped member and the second plate-shaped member.

8. The light source module according to claim 1, wherein the light source is a quantum cascade laser.

9. The light source module according to claim 1, further comprising:

a compressor configured to apply compression force to a compression portion that is a part of the optical fiber, wherein the compression portion is compressed in at least one direction intersecting an extending direction of the compression portion by the compression force.

10. The light source module according to claim 9, wherein the compression portion is a part other than the first portion in the optical fiber.

11. The light source module according to claim 9, wherein the compressor is formed of one of the pair of holding members.

12. The light source module according to claim 9, wherein the compressor is configured to change a magnitude of the compression force.

13. The light source module according to claim 9, further comprising:

a housing that accommodates the light source, the optical fiber, the pair of holding members, the first vibrator, and the second vibrator, wherein the compression portion is a part of the optical fiber, the part being located outside the housing.

14. The light source module according to claim 9, wherein the compression portion is compressed along a single direction intersecting the extending direction of the compression portion.

15. The light source module according to claim 9, wherein the compression portion is compressed over an entire periphery.

* * * * *